United States Patent
Oku

(10) Patent No.: US 8,044,597 B2
(45) Date of Patent: Oct. 25, 2011

(54) DRIVE CIRCUIT OF FLUORESCENT DISPLAY

(75) Inventor: Hideki Oku, Chiba (JP)

(73) Assignee: Futaba Corporation, Mobara-shi, Chiba (JP)

( * ) Notice: Subject to any disclaimer, the term of this patent is extended or adjusted under 35 U.S.C. 154(b) by 396 days.

(21) Appl. No.: 12/464,395

(22) Filed: May 12, 2009

(65) Prior Publication Data

US 2009/0289558 A1 Nov. 26, 2009

(30) Foreign Application Priority Data

May 23, 2008 (JP) ................................. 2008-134893

(51) Int. Cl.
G09G 3/10 (2006.01)
(52) U.S. Cl. ...................... 315/169.1; 315/172; 315/176; 315/226; 315/244; 315/299
(58) Field of Classification Search .................. 315/160, 315/167, 169.1, 172, 174–176, 209 R, 224–226, 315/244, 246, 291, 299

See application file for complete search history.

(56) References Cited

U.S. PATENT DOCUMENTS 7,550,934 B1 * 6/2009 Deng et al. ..................... 315/308
2005/0168161 A1 * 8/2005 Chiou .......................... 315/225

FOREIGN PATENT DOCUMENTS

JP 02-190893 7/1990
JP 2007-072323 3/2007

* cited by examiner

*Primary Examiner* — Jason M Crawford
(74) *Attorney, Agent, or Firm* — Quarles & Brady LLP

(57) ABSTRACT

A drive circuit for a fluorescent display that can prevent generation of reactive power in a Zener diode used to generate a cutoff bias voltage. In one embodiment, the drive circuit operates as a single ended primary inductor converter (SEPIC) circuit and includes an input side closed circuit, an output side closed circuit, and a coupling capacitor connecting the two closed circuits. The input side closed circuit includes an input power source, a first inductor and a switching element. The output side closed circuit includes a second inductor, a diode and a second capacitor. A filament of the fluorescent display is connected to the second capacitor. One end of a Zener diode is connected to a negative potential side of the filament and the other end of the Zener diode is connected to an input power source.

6 Claims, 4 Drawing Sheets

DRIVE CIRCUIT OF FLUORESCENT DISPLAY

CROSS-REFERENCE TO RELATED APPLICATIONS

This application claims priority to Japanese Patent Application No. 2008-134893 filed on May 23, 2008, the contents of which are fully incorporated herein by reference.

STATEMENT CONCERNING FEDERALLY SPONSORED RESEARCH OR DEVELOPMENT

Not applicable.

BACKGROUND

1. Field of the Invention

The present invention relates to a drive circuit for a fluorescent display.

2. Description of the Related Art

A drive circuit 10 for a conventional fluorescent display 12 is illustrated schematically in FIG. 4. The fluorescent display 12 includes a filament F, a plurality of anode electrodes A1-An, and a plurality of grids G1-Gm. The filament F emits thermoelectrons into a vacuum case, not shown. Each of the anodes A1-An are covered with a fluorescent substance. The grids G1-Gm control the thermoelectrons emitted from the filament F. A control circuit 11 selectively applies a first direct current (DC) input voltage HV1 to the anodes A1-An through anode lines a1-an. The control circuit 11 also selectively applies a second DC input voltage HV2 to the grids G1-Gm through grid lines g1-gm. A third DC input voltage HV3 is applied to the filament F through a first switching element Tr1. A first pulsed control voltage Vc1 is applied to the first switching element Tr1.

Generally, the same voltage is used for each of the input voltages HV1, HV2, HV3. The first switching element Tr1 is switched ON and OFF by the pulsed control voltage Vc1, to chop the third input voltage HV3 into a pulsed DC voltage that is applied to the filament F.

The anodes A1-An are arranged opposed to the grids G1-Gm. When an opposed anode A1 and grid G1 are selected at the same time (i.e., when input voltages HV1 and HV2 are simultaneously applied to A1 and G1), the fluorescent substance on the anode A1 emits light. However, the fluorescent substance covering the non-selected anodes A2-An may also emit a slight amount of light due to leakage emission. To prevent leakage emission, the drive circuit 10 applies a cutoff bias voltage to the non-selected anodes A2-An and/or grids G2-Gm. To generate the cutoff bias voltage, a Zener diode ZD is used in the conventional fluorescent display 12. See, e.g., Japanese patent publication Nos. 02-190893 and No. 2007-72323, the contents of which are fully incorporated herein.

In operation, when the first switching element Tr1 is turned ON, a filament current flows into the filament F. The filament current also flows through the Zener diode ZD and generates reactive power therein. For this reason, a second switching element Tr2 is connected to the Zener diode ZD in parallel. The second switching element Tr2 is controlled by a second pulsed control voltage Vc2 from the control circuit 11 and can be switched ON and OFF. When the filament current flows into the filament F (i.e., while the first switching element Tr1 is ON), the second switching element Tr2 is turned ON by the pulsed control voltage Vc2 and the Zener diode ZD is shorted. Therefore, when the filament current flows through the filament F, no current flows through the Zener diode ZD and as a result, no reactive power is generated. The drive circuit 10 is needed to connect the second switching element Tr2 to the Zener diode ZD. However, ON-OFF control of the second switching element Tr2 needs to be coordinated with the first switching element Tr1. As a result, the control of the second switching element Tr2 becomes complex.

In view of the above problem, it would be desirable to have a drive circuit for a fluorescent display in which the filament current does not flow through the Zener diode used to generate the cutoff bias voltage, thus eliminating the need for a switching element connected in parallel to short the Zener diode.

SUMMARY OF THE INVENTION

According to a first aspect of the present invention, a drive circuit for a fluorescent display includes a filament, a grid, an anode and a Zener diode for generating a cutoff bias voltage applied to the grid and the anode. The drive circuit includes a single ended primary inductor converter (SEPIC) circuit with an input side dosed circuit having an input power, a first inductor and a switching element, an output side closed circuit having a second inductor, a diode and a capacitor, and a coupling capacitor. The Zener diode is connected between an input power and a ground. A connecting point between a cathode of the Zener diode and the input power is connected to a negative electric potential side of the filament. An output voltage of the SEPIC circuit is applied only to the filament.

According to a second aspect of the present invention, the input power, the first inductor and the switching element are connected together in series in the input side closed circuit. The second inductor, the diode and the capacitor are connected together in series in the output side closed circuit. Furthermore, the coupling capacitor is connected to a connecting point between the first inductor and the switching element and a connecting point between the second inductor and the diode.

According to a third aspect of the present invention, a load side closed circuit is formed with the capacitor and the filament in the output side closed circuit.

According to a fourth aspect of the present invention, the capacitor of the output side closed circuit and two circuits, with each circuit connecting two reverse polarity switching elements in series, are connected in parallel, and both ends of the filament are connected to connecting points between both switching elements of the two circuits respectively.

A drive circuit for a fluorescent display according to the present invention forms an output side closed circuit in a SEPIC circuit with a second inductor, a diode and a capacitor. A load side closed circuit is formed with the capacitor and a filament. A Zener diode, used for generating a cutoff bias voltage, is not included in either the output closed circuit or the load side closed circuit. Therefore, an output voltage of the output side closed circuit is applied only to the filament F, and not to the Zener diode. Also, a filament current flows only into the filament F, and does not flow into the Zener diode. As a result, reactive power caused by the filament current is not generated in the Zener diode.

In the drive circuit for a fluorescent display according to the present invention, a switching element for shorting the Zener diode is not needed, unlike with the conventional drive circuit. Therefore, a circuit for preventing generation of reactive power is simple and control means, such as a switching element for shorting the Zener diode are not required. Also, the drive circuit of the present invention can adjust a voltage applied to the filament F by changing a duty ratio of a control signal that controls the ON-OFF operation of the switching element of the input side closed circuit of the SEPIC circuit.

The above and other objects and features of this invention will become more apparent from the following description taken in conjunction with the accompanying drawings.

BRIEF DESCRIPTION OF DRAWINGS

FIG. 1(b2) shows an electric potential at point B in the drive circuit of FIG. 1(a);

FIG. 1(b3) shows a profile of a current flowing through an inductor in the drive circuit of FIG. 1(a);

FIG. 1(b4) shows the ON and OFF state of the switching element in the drive circuit of FIG. 1(a);

DESCRIPTION OF PREFERRED EMBODIMENTS

Figure 1A:
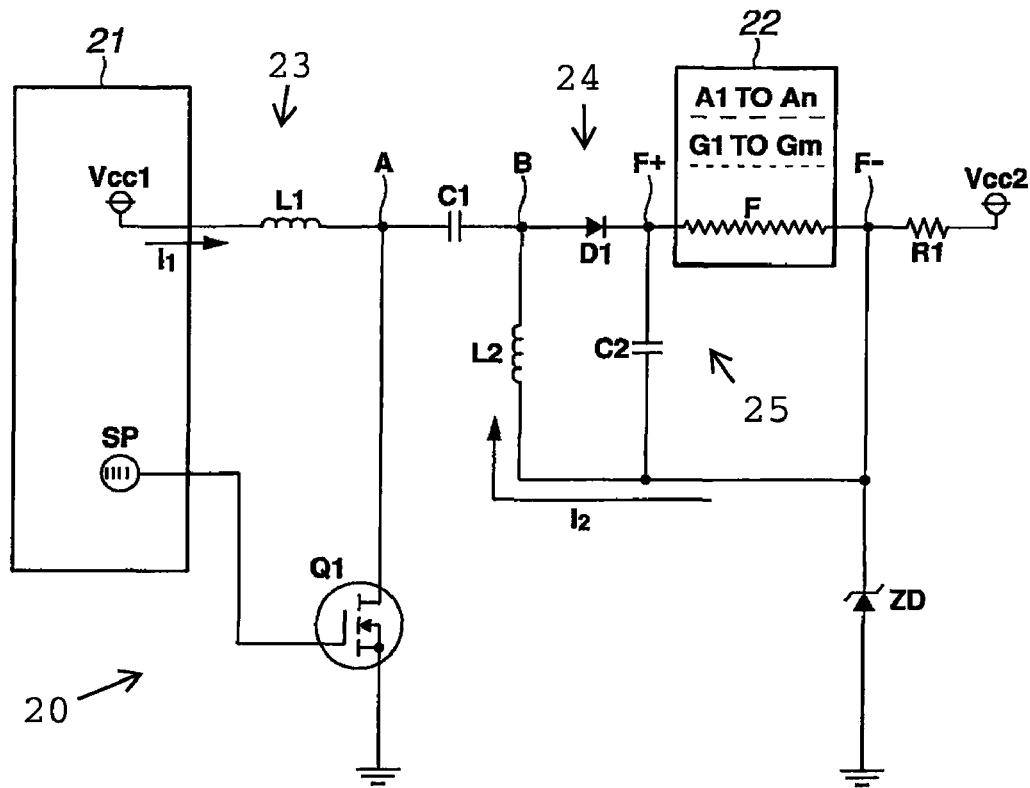
FIG. 1(a) shows a drive circuit for a fluorescent display in accordance with one embodiment of the present invention.

Embodiments of the present invention are explained by referring to FIGS. 1(a) to 3. Also, in FIGS. 1(a) to 3, common components use the same reference numerals.

Figure 1:
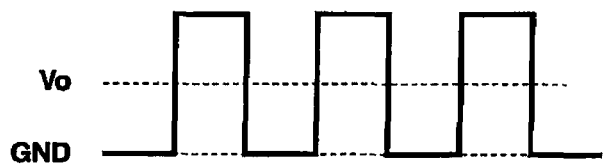
FIG. 1(b1) shows an electric potential at point A in the drive circuit of FIG. 1(a)
Figure 1:
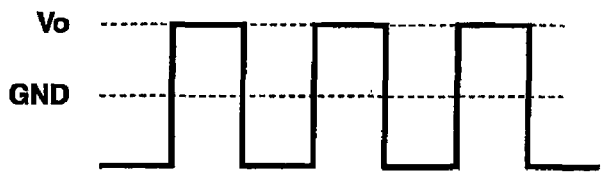
Figure 1:
Figure 1:

FIG. 1(a) schematically illustrates a drive circuit 20 for a fluorescent display 22 according to one embodiment of the present invention. FIG. 1(b1) shows an electric potential at a first connecting point A in the drive circuit 20. FIG. 1(b2) shows an electric potential at a second connecting point B in the drive circuit 20. FIG. 1(b3) shows a profile of current flow through first and second inductors L1 and L2 in the drive circuit 20 of FIG. 1(a). FIG. 1(b4) shows the ON-OFF states of a switching element, such as a transistor, Q1 in the drive circuit 20.

Figure 4:
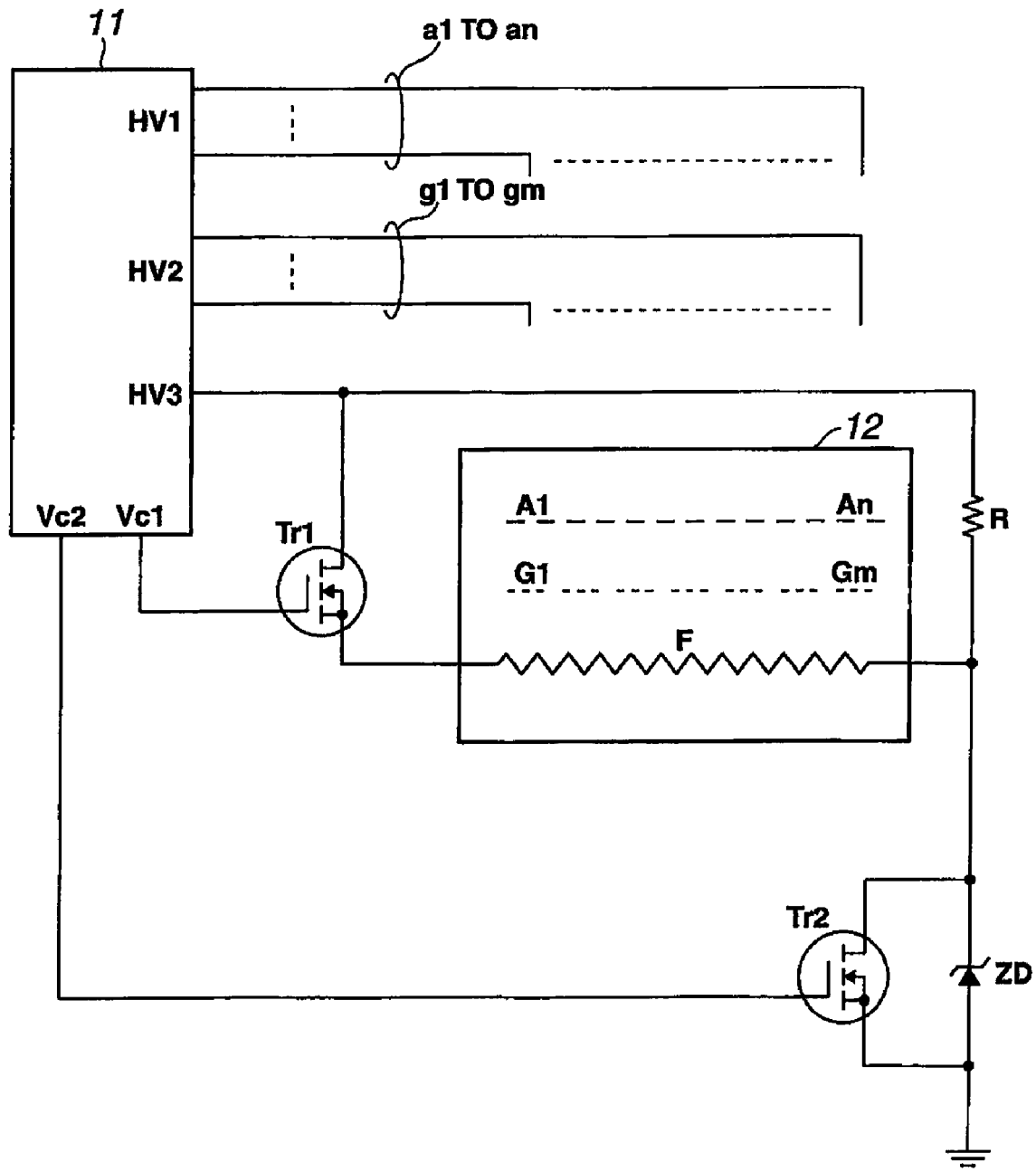
FIG. 4 shows a drive circuit for a conventional fluorescent display.

As shown in FIG. 1(a), reference numeral 21 represents a control circuit, reference numeral 22 represents a fluorescent display, and reference characters Vcc1 and Vcc2 denote first and second DC input voltages. The fluorescent display 22 is the same as the fluorescent display 12 of FIG. 4. The fluorescent display 22 has n anodes A1-An, m grids G1-Gm and a filament F emitting thermoelectrons. The anodes A1-An and grids G1-Gm are connected to a respective anode line and grid line, not shown. A drive voltage is selectively applied to each line. An output, or drive, voltage of a single ended primary inductor converter (SEPIC) circuit, discussed below, is applied to the filament F.

The switching element Q1 is switched in response to a pulsed control signal supplied from a control power SP. Reference character ZD represents a Zener diode used for generating a cutoff bias voltage. The Zener diode ZD applies the cutoff bias voltage to the anodes A1-An and the grids G1-Gm. The Zener diode is connected between the second DC input power Vcc2 and a ground. A cathode of the Zener diode ZD is connected to a negative electric potential side F− of the filament F and an anode of the Zener diode ZD is connected to the ground.

The drive circuit 20 further includes an input side closed circuit 23 and an output side closed circuit 24. The input side closed circuit 23 includes the first input power Vcc1, the first inductor L1 and the switching element Q1. The output side closed circuit 24 includes the second inductor L2, a diode D1 and a second capacitor C2. The input and output side closed circuits 23, 24 are connected together through a first, or coupling, capacitor C1. The first capacitor C1 is connected between the first connecting point A, which connects the first inductor L1 to the switching element Q1 and the second connecting point B which connects the second inductor L2 with the anode of the diode D1.

A third connecting point which connects the second capacitor C2 with the cathode of the diode D1 is further connected to a positive electric potential side F+ of the filament F. Furthermore, a fourth connecting point which connects the second capacitor C2 with the second inductor L2 is also connected to the negative electric potential side F− of the filament F. Thus, both ends of the filament F are connected to the second capacitor C2 in the output side closed circuit 24. Together, the second capacitor C2 and the filament F form a load side closed circuit 25.

A circuit comprised of the input side closed circuit 23, first capacitor C1, and output side closed circuit 24 is generally known as a single ended primary inductor converter (SEPIC) circuit. SEPIC circuits are DC-DC converters with an output voltage controlled by the duty cycle of the control transistor to be greater than, less than, or equal to the power supply voltage.

In operation, the switching element Q1 is repeatedly switched ON and OFF in response to the pulsed control signal of the control power SP as shown in FIG. 1(b4). When the switching element Q1 is turned ON, the input side closed circuit 23 is formed. As a result, the electric potential at the first connecting point A becomes the same electric potential as a ground potential GND. Furthermore, a current $I_1$ flows into the first inductor L1. The current $I_1$ passing through the first inductor L1 increases according to the current profile $I_L$ shown in FIG. 1(b3) and energy is stored in the first inductor L1. A second current $I_2$ flowing through the second inductor L2 flows into the second capacitor C2, which becomes a voltage generator as described below, and likewise, energy is stored in the second inductor L2. The current $I_2$ passing through the second inductor L2 also increases according to the current profile $I_L$ shown in FIG. 1(b3). The current values of the two currents $I_1$, $I_2$ are different but the rising and falling characteristics of the illustrated current profile $I_L$ are the same.

When the switching element Q1 is switched OFF, the energy stored in the first inductor L1 flows into the first capacitor C1. The electric potential at the first connecting point A increases as shown in FIG. 1(b1). The first capacitor C1 becomes a voltage generator called a "considered voltage generator." Additionally, the electric potential at the second connecting point B increases as shown in FIG. 1(b2). As a result, the diode D1 is turned ON and the energy stored in the second inductor L2 flows into and charges the second capacitor C2.

Therefore, the second capacitor C2 becomes an output power source for the SEPIC circuit and becomes a drive power source for the filament F. An output voltage of the SEPIC circuit (i.e., an output voltage of the output side closed circuit) is applied to the filament F, and the filament current flows therethrough. $V_0$, shown in FIGS. 1(b1) and 1(b2), is an electric potential of the positive electric potential side F+ in the filament F.

The drive circuit 20 in FIG. 1(a) includes the output side closed circuit 24 with the second inductor L2, diode D1, and second capacitor C2. In addition, the drive circuit 20 of FIG. 1(a) includes the load side closed circuit 25 with the second capacitor C2 and the filament F. The Zener diode ZD is not included in either of the closed circuits 23, 24. Therefore, the output voltage of the output side closed circuit 24 is applied only to the filament F, and not to the Zener diode ZD. The filament current flows only into the filament F, and not into the Zener diode ZD. As a result, no reactive power caused by the filament current is generated in the Zener diode ZD. Therefore, a parallel-connected switching element for shorting the Zener diode ZD, such as used in conventional drive circuits, is not needed. Without the parallel-connected switching element, no additional control means, such as found in the conventional drive circuit 10, are needed. Because the drive voltage from the SEPIC circuit is supplied to the filament F, it is possible to adjust the voltage applied to the filament F by changing the duty ratio of the control signal which controls the ON-OFF state of the switching element Q1.

Figure 2A:
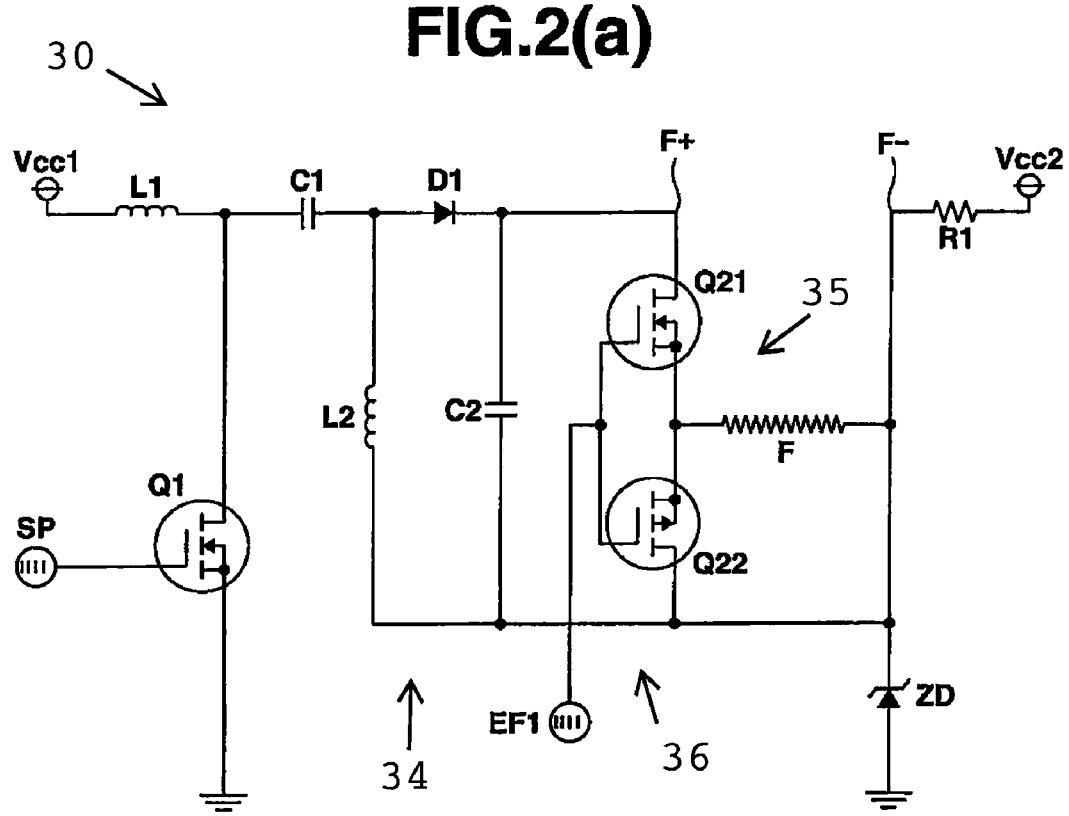
FIG. 2(a) shows a pulse driven circuit using the drive circuit of FIG. 1(a)

Additional drive circuits constructed in accordance with further embodiments of the present invention are shown in FIGS. 2(a) and (b). The drive circuit 30 of FIG. 2(a) uses the drive circuit 20 of FIG. 1(a) to produce a pulsed current output. The drive circuit 40 of FIG. 2(b) uses the same drive circuit 20 to produce an alternating current output. The anodes and grids of the fluorescent display are omitted in FIGS. 2(a) and 2(b).

FIG. 2(a) schematically illustrates an example of a pulsed current drive circuit. As shown, the drive circuit 30 includes a circuit 36 of series-connected reverse polarity first and second switching elements Q21, Q22 connected in parallel with a second capacitor C2 of an output side closed circuit 34. Also, the positive electric potential side F+ of a filament F is connected to a connecting point that connects the first switching element Q21 to the second switching element Q22. Thus, the second capacitor C2 and the filament F form a load side closed circuit 35 through the first and second switching elements Q21, Q22. The first and second switching elements Q21, Q22 are repeatedly and alternately switched ON and OFF in response to a pulsed control signal supplied from a control power EF1.

When the first switching element Q21 is switched ON, the second switching element Q22 is switched OFF. Thereafter, the filament current flows into the filament F. When the first switching element Q21 is switched OFF, the second switching element Q22 is switched ON and the filament current does not flow thereto. Therefore, pulsed current is produced and flows into the filament F.

Figure 2B:
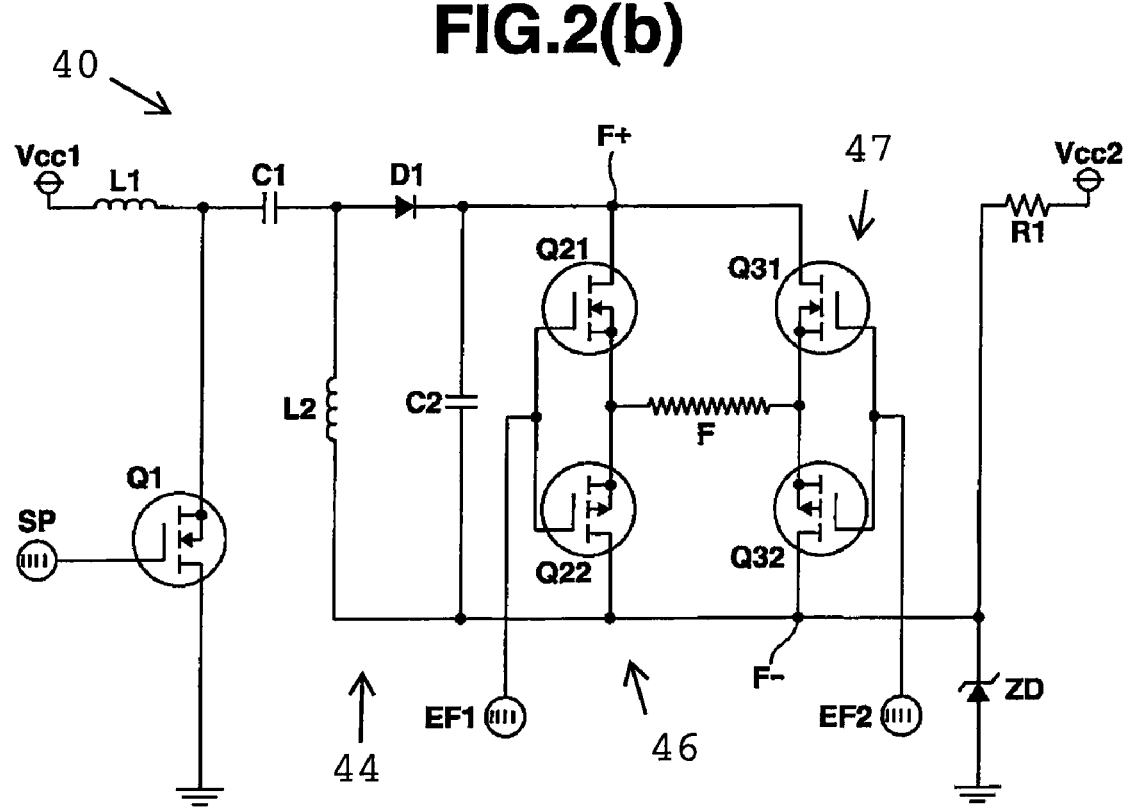
FIG. 2(b) shows an alternately driven circuit using the drive circuit of FIG. 1(a)

FIG. 2(b) schematically illustrates an example of an alternating current drive circuit. As shown, drive circuit 40 includes a first circuit 46 of first and second series-connected reverse polarity switching elements Q21, Q22 and a second circuit 47 of third and fourth series-connected reverse polarity switching elements Q31, Q32 connected in parallel with a second capacitor C2 of an output side closed circuit 44. One end of a filament F is connected to a connecting point between the first switching element Q21 and the second switching element Q22. The other end of the filament F is connected to a connecting point between the third switching element Q31 and the fourth switching element Q32. Thus, the second capacitor C2 and the filament F form a load side closed circuit 45 through the switching elements Q21, Q22, Q31, and Q32.

The first and second switching elements Q21 and Q22 are repeatedly and alternately cycled ON and OFF in response to a pulsed control signal supplied from a first control power EF1. Furthermore, the third and fourth switching elements Q31 and Q32 are repeatedly and alternately switched ON and OFF in response to a pulsed control signal supplied from a second control power EF2. A frequency of the control signal of the first control power EF1 is the same as a frequency of the control signal of the second control power EF2. However, the phases of the two control signals are different because the first and third switching elements Q21, Q31 are unipolar and the second and fourth switching elements Q22, Q32 are unipolar.

For example, when the first and fourth switching elements Q21, Q32 are switched ON and the second and third switching elements Q22, Q31 are switched OFF, the filament current flows through the first switching element Q21, the filament F and the fourth switching element Q32 in that order. Likewise, when the third and second switching elements Q31, Q22 are switched ON and the first and fourth switching elements Q21, Q32 are switched OFF, the filament current flows through the third switching element Q31, the filament F and the second switching element Q22 in that order. Thus alternating current is produced and flows into the filament.

Figure 3:
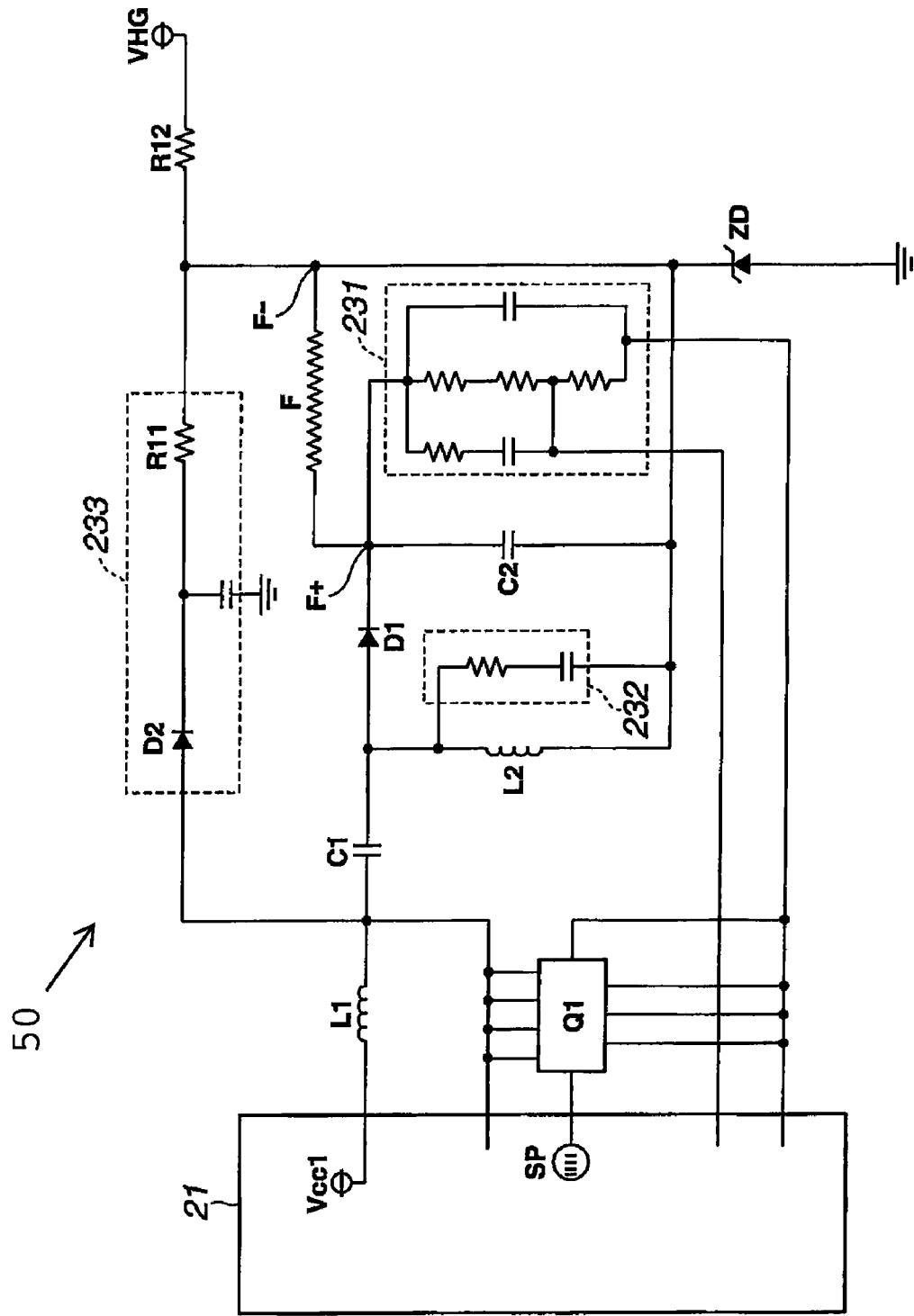
FIG. 3 shows a more detailed drive circuit for a fluorescent display in accordance with another embodiment of the present invention.

FIG. 3 schematically illustrates a more detailed drive circuit in accordance with yet another embodiment of the present invention. The anode and grid of the fluorescent display are omitted in FIG. 3. In the drive circuit 50, first and second circuits 231, 232 are connected with each circuit 231, 232 including a stabilizing resistor and a capacitor. A first input power Vcc1 is connected to a negative electric potential side F− of a filament F through a third circuit 233 including a diode D2 and a resistor R11. A high-voltage input power VHG, with a voltage higher than that of the first input power Vcc1, is also connected to the negative electric potential side F−.

When an electric potential of the negative electric potential side F− of the filament F is higher than a voltage of the first input power Vcc1, it is possible that no current flows into a Zener diode ZD. Therefore, a voltage of the high-voltage input power VHG is higher than a voltage of the first input power Vcc1. The two input powers Vcc1 and VHG correspond to the second input power Vcc2 of the drive circuit 20 of FIG. 1(a). One MOS-type field effect transistor (FET) suitable for use as the switching element Q1 is model number TPCA8022 commercially available from TOSHIBA.

While a number of preferred embodiments have been described herein, the present invention is not limited thereto. Various changes and modifications can be made within the scope of the present invention.

The invention claimed is:

1. A drive circuit for a fluorescent display having a filament, a grid, an anode, and a Zener diode for generating a cutoff bias voltage applied to the grid and the anode the drive circuit comprising:
   an input side closed circuit including a first input power source, a first inductor, and a switching element;
   an output side closed circuit including a second inductor, a diode and a capacitor; and
   a coupling capacitor;
   wherein the Zener diode of the fluorescent display is connected between a second input power source and a ground, a negative electric potential side of the filament is connected at a point between a cathode of the Zener diode and the second input power source, and an output voltage of the drive circuit is applied only to the filament.

2. The drive circuit of claim 1, wherein the first input power source, first inductor, and switching element of the input side closed circuit are connected together in series, the second inductor, diode, and capacitor of the output side closed circuit are connected together in series, and the coupling capacitor is connected to the input side closed circuit at a point between the first inductor and the switching element and to the output side closed circuit at a point between the second inductor and the diode.

3. The drive circuit of claim 2, wherein the capacitor and the filament of the output side closed circuit form a load side closed circuit.

4. The drive circuit of claim 3, further comprising two series-connected reverse polarity switching elements, wherein the capacitor of the output side closed circuit and the two series-connected reverse polarity switching elements are connected together in parallel, and a positive electric potential side of the filament is connected to a point between the two series-connected switching elements.

5. The drive circuit of claim 3, further comprising two sets of two series-connected reverse polarity switching elements connected in parallel to each other and in parallel to the capacitor of the output side closed circuit, wherein ends of the filament are connected to the two sets of two series-connected switching elements at points between the two series-connected switching elements.

6. A combined drive and fluorescent display circuit, the combined circuit comprised of:
   a drive circuit including:
      an input side closed circuit with a first input power source, a first inductor, and a switching element,
      an output side closed circuit with a second inductor, a diode and a first capacitor; and
      a coupling capacitor connected between the input side closed circuit and the output side closed circuit; and
   a fluorescent display circuit including:
      a filament,
      a grid,
      an anode,
      a second input power source, and
      a Zener diode,
      wherein the Zener diode is connected between the second input power source and a ground and generates a cutoff bias voltage applied to the grid and the anode, wherein a negative electric potential side of the filament is connected between a cathode of the Zener diode and the second input power source, and wherein an output voltage of the drive circuit is limited to the filament.

* * * * *

UNITED STATES PATENT AND TRADEMARK OFFICE
CERTIFICATE OF CORRECTION

PATENT NO.        : 8,044,597 B2                                Page 1 of 1
APPLICATION NO.   : 12/464395
DATED             : October 25, 2011
INVENTOR(S)       : Hideki Oku It is certified that error appears in the above-identified patent and that said Letters Patent is hereby corrected as shown below:

Title Page, Item (54) and at Column 1, lines 1 and 2, the title of the invention "DRIVE CIRCUIT OF FLUORESCENT DISPLAY" should be changed to -- DRIVE CIRCUIT FOR A FLUORESCENT DISPLAY --

Column 2, line 22 "dosed circuit" should be changed to -- closed circuit --

Signed and Sealed this
Third Day of January, 2012

David J. Kappos
*Director of the United States Patent and Trademark Office*